3,535,347
DYES OF THE DIAMINOTRIARYLMETHANE SERIES
Peter Bitterli, Reinach, Basel-Land, Switzerland, assignor to Sandoz Ltd. (also known as Sandoz A.G.), Basel, Switzerland
No Drawing. Filed May 3, 1967, Ser. No. 635,712
Claims priority, application Switzerland, May 10, 1966, 6,797/66
Int. Cl. C09b *11/14, 11/16*
U.S. Cl. 260—393   23 Claims

ABSTRACT OF THE DISCLOSURE

This invention relates to basic dyes of the diaminotriarylmethane series of Formula I, their production and use.

---

Especially it relates to a process for the dyeing or printing of fibres, or textile materials made thereof, which consist of or which contain acrylonitrile polymers or copolymers. The process is characterised by the use of basic dyes of the diaminotriarylmethane series having the formula

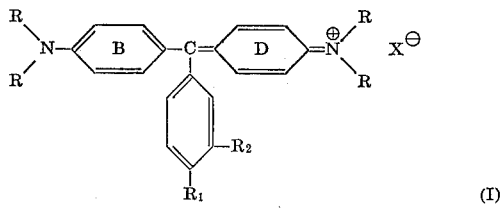

(I)

where one of the symbols $R_1$ and $R_2$ stands for hydrogen and the other for a cyano, alkylsulphonyl, arylsulphonyl, alkylcarbonyl or arylcarbonyl radical or for a sulphonic acid amide or carboxylic acid amide radical which may be substituted, two of the radicals R stand for cyanalkyl or hydroxyalkyl, the remaining two radicals R for alkyl radicals which may be substituted, and $X^\ominus$ for an anion equivalent to the dye cation, and in which the rings B and/or D may be further substituted. Examples of good dyes of Formula I are those in which the aromatic rings B and D are substituted.

Dyeings of good quality are obtained when, for example, dyes of formula

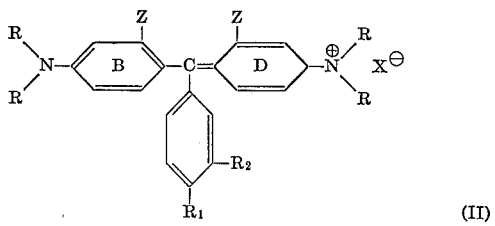

(II)

are used, in which formula each Z stands for a halogen atom or an alkyl or alkoxy radical which may be substituted, preferably by an optionaly substituted lower alkyl or alkoxy radical.

Equally good dyeings are obtained with dyes of formula

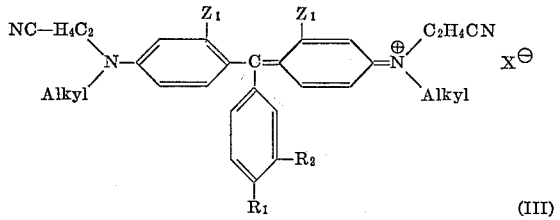

(III)

where each $Z_1$ represents an alkyl or alkoxy radical having 1 to 4 carbon atoms and "alkyl," a lower alkyl radical.

Dyes of Formula III in which each $Z_1$ stands for a methyl, ethyl, methoxy or ethoxy radical are particularly well suitable for use in the process.

Dyeings of the same good quality are obtained with the dyes of formula

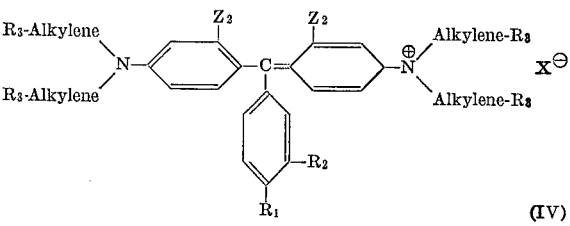

(IV)

where each $R_3$ stands for the hydroxyl or cyano group and each $Z_2$, for a hydrogen or halogen atom or for an alkyl or alkoxy radical, which latter radical may be substituted.

Particularly good dyeings are obtained when dyes of formula

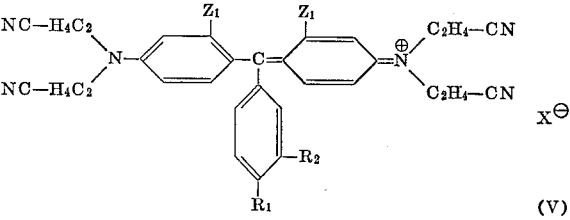

(V)

are used, for example dyes of this formula in which each $Z_1$ represents an alkyl or alkoxy radical having 1 to 4 carbon atoms, more particularly a methyl, ethyl, methoxy or ethoxy radical.

Particularly good dyeings are given by dyes of Formula V in which $Z_1$ denotes a methyl radical and $R_1$ an optionally substituted sulphonic acid amide radical.

Excellent dyeings are obtained with dyes of Formula I in which $R_1$ represents an optionally substituted sulphonic acid amide radical, and also with dyes of formula

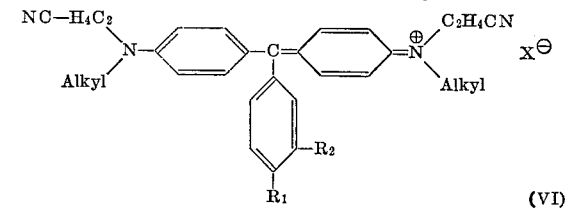

(VI)

in particular dyes of Formula VI in which "alkyl" represents an ethyl radical and $R_1$ an optionally substituted sulphonic acid amide group.

The dyes of Formula I can be produced by condensing 1 mole of a compound of formula

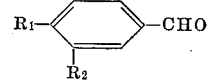

(VII)

with 2 moles of a compound of formula

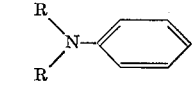

(VIII)

to form the leuco base of formula

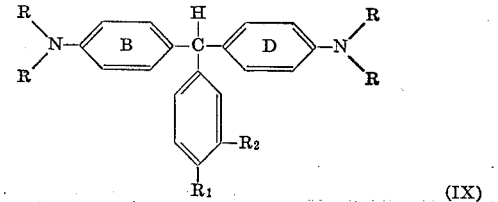

(IX)

and oxidizing this in acid solution by one of the known methods.

An alternative method of production for the dyes of Formula I is to react a compound of formula

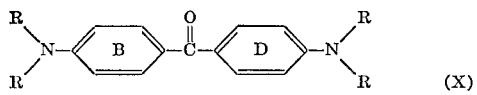 (X)

with a compound of formula

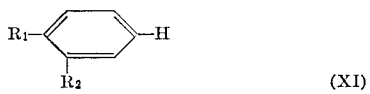 (XI)

to form the corresponding carbinol base and to convert this into a dye of Formula I by acid treatment.

Another route leading to the dyes of Formula I is to condense a compound of formula

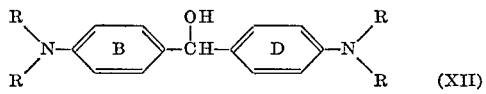 (XII)

with a compound of Formula XI to obtain the leuco base of Formula IX and to oxidise the base to the final dye.

Certain dyes of Formula I can be produced by exchanging the hydrogen in the 4-position of the ring E of a leuco base of formula

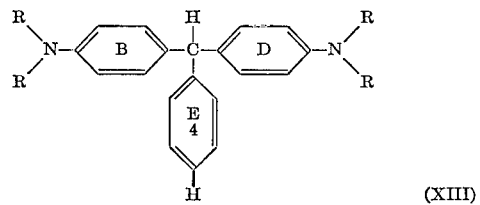 (XIII)

for a cyano, alkylsulphonyl, arylsulphonyl, alkylcarbonyl or arylcarbonyl radical or for an optionally substituted sulphonic acid amide or carboxylic acid amide radical, and to oxidize the reaction product by one of the known methods.

The dyes of Formula I can be used either singly or in mixture with each other.

The alkyl radicals contain, e.g., 1 to 8 or preferably 1 to 4 carbon atoms.

The rings B and/or D may be substituted, for example by halogen, such as chlorine, bromine or fluorine, or by an optionally substituted alkyl or alkoxy radical having 1 to 10 or preferably 1 to 4 carbon atoms, e.g. —CF$_3$. It is of special advantage for two of the radicals R to stand for hydroxyethyl or cyanethyl radicals, while the other two radicals R represent, preferably, cyanethyl radicals or lower, unsubstituted or substituted alkyl radicals having 1 to 4 carbon atoms.

The anion $X^\ominus$ may be an organic or inorganic ion, e.g. a halogen ion, such as that of chlorine, bromine or iodine, or the ion of methylsulphate, sulphate, disulphate, perchlorate, phosphate, phosphotungstate, phosphotungstic molybdate, benzenesulphonate, 4-chlorobenzenesulphonate, oxalate, maleinate, formate, acetate, propionate, methanesulphonate, chloroacetate or benzoate, or a complex anion such as that of zinc chloride double salts.

"Alkylene" stands preferably for a radical of formula —(CH$_2$)$_n$— where $n$ denotes a whole number from 1 to 6 preferably 2; this alkylene radical may be branched if desired.

Examples of alkyl sulphonyl radicals are those of formula R$_4$—SO$_2$— where R$_4$ may stand for a substituted or unsubstituted alkyl radical having, for example, 1 to 6 carbon atoms. Arylsulphonyl radicals are those of the formula R$_5$—SO$_2$— where R$_5$ may stand for a substituted or unsubstituted phenyl or naphthyl radical.

Alkylcarbonyl radicals are of the formula —CO—R$_6$ where R$_6$ may stand for a substituted or unsubstituted alkyl radical having, for example, 1 to 6 carbon atoms.

Arylcarbonyl radicals are of the formula —CO—R$_7$ where R$_7$ may represent a phenyl or naphthyl radical which may be substituted. The sulphonic acid amide group stands for a radical of formula

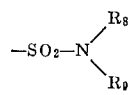

where each of the radicals R$_8$ and R$_9$ represents a hydrogen atom or an optionally substituted hydrocarbon radical, e.g. an alkyl, phenyl, naphthyl or cyclohexyl radical. The sulphonic acid amide group may be introduced by a subsequent reaction, for example when R$_1$ or R$_2$ stands for —SO$_2$—Cl, by aminating the last-named group. The carboxylic acid amine group stands for a radical of formula

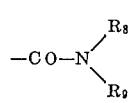

The term "acrylonitrile polymers" is used with special reference to polymers consisting to more than 80% of acrylonitrile. Acrylonitrile copolymers are composed, in general, of 80-95% acrylonitrile and 20-5% vinyl acetate, vinyl pyridine, vinyl chloride, vinylidene chloride, acrylic acid, acrylic acid ester, methacrylic acid, methacrylic acid ester, etc.

The dyes defined in the foregoing are applied to these materials preferably from an aqueous medium of neutral or acid reaction, and at boiling temperature or at temperatures above 100° C. when closed dyeing equipment is used. The dyes of Formula I can be applied from aqueous solution or dispersion, if necessary in the presence of a dissolving intermediary, e.g. a polyglycol ether of a higher fatty alcohol. It is advisable to use approximately 0.2–1 gram of a polyglycolether to 1 gram of dye. The commercially available retarders can be used without causing interference, though they are not necessary since very level dyeings of good all-round fastness can be produced without their assistance.

U.S. Pat. 3,021,344 teaches the use of a dye of formula

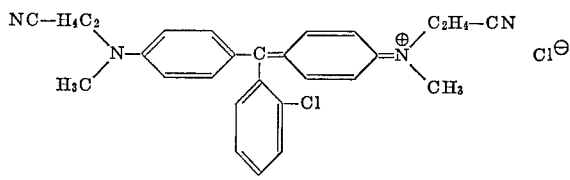

for the dyeing of polyacrylonitrile fibres that have been modified by the introduction of acid groups. This dye has poor light fastness on this type of polyacrylonitrile fibre.

It was surprising, since it was not inferable from the present state of the art, that dyes of Formula I would give dyeings on these modified polyacrylonitrile fibres showing better fastness to light than that of the known dye. In addition, these dyeings are very fast to wet tests, the fastness to washing, water, sea water, perspiration and milling being particularly good. The dyes preserve wool.

In the following examples the parts and percentages are by weight and the temperatures are in degrees centigrade.

EXAMPLE 1

One part of the dye of formula

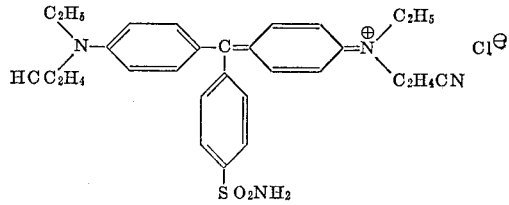

is pasted with 1 part of 40% acetic acid. 400 parts of distilled water at 60° are run on to the paste with constant stirring and the solution is boiled for a while to complete dissolving. It is then diluted with 7600 parts of distilled water, after which 2 parts of glacial acetic acid are added. 100 parts of polyacrylonitrile material are entered into this dyebath at 60° after a previous treatment of 10-15 minutes at 60° in a bath of 8000 parts of water and 2 parts of glacial acetic acid. The dyebath is raised to 100° in 30 minutes and held at this temperature for 1 hour. On removal, the material is rinsed and dried. A level, brilliant green dyeing is obtained which has good fastness to light and wet treatments Dyeings of comparable quality are obtained when the dye used in this example or any of the dyes listed in the following table are applied in the presence of 0.2–1 part of a polyglycol ether of a higher fatty alcohol in accordance with the procedure of Example 1.

Equally good dyeings are obtained when the dye is initially pasted with 2/normal sulphuric acid, preferably with 0.2 part, or with formic acid, for example 1 part of 80% formic acid.

The dyes enumerated in the following table can be dyed by the method described above.

These dyes conform to the formula

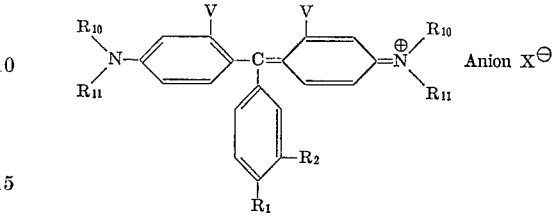

where $R_1$, $R_2$, $R_{10}$, $R_{11}$, V and $X^\ominus$ have the meanings assigned to them in the table.

| Ex. No. | $R_1$ | $R_2$ | $R_{10}$ | $R_{11}$ | V | Anion $X_1^\ominus$ | Shade of dyeing on polyacrylonitrile fibre |
|---|---|---|---|---|---|---|---|
| 2 | $SO_2N(CH_3)_2$ | H | $C_2H_5$ | $C_2H_4CN$ | H | $Cl^\ominus$ | Green. |
| 3 | $SO_2NH_2$ | H | $CH_3-(CH_2)_3-$ | $C_2H_4CN$ | H | $HSO_4^\ominus$ | Do. |
| 4 | $SO_2N(CH_3)_2$ | H | $CH_3$ | $C_2H_4CN$ | H | $Cl^\ominus$ | Do. |
| 5 | $SO_2NHC_2H_4OH$ | H | $CH_3$ | $C_2H_4CN$ | H | $HSO_4^\ominus$ | Do. |
| 6 | $SO_2N(C_2H_4OH)_2$ | H | $CH_3$ | $C_2H_4CN$ | H | $Cl^\ominus$ | Do. |
| 7 | $SO_2CH_3$ | H | $CH_3$ | $C_2H_4CN$ | H | $HSO_4^\ominus$ | Do. |
| 8 | $SO_2NH_2$ | H | $C_2H_4OH$ | $C_2H_4OH$ | H | $HCOO^\ominus$ | Do. |
| 9 | H | $SO_2N(CH_3)_2$ | $CH_3$ | $C_2H_4CN$ | H | $Cl^\ominus$ | Blue-green. |
| 10 | CN | H | $CH_3$ | $C_2H_4CN$ | H | $Cl^\ominus$ | Green. |
| 11 | H | $SO_2NH_2$ | $C_2H_5$ | $C_2H_4CN$ | H | $HSO_4^\ominus$ | Blue-green. |
| 12 | $CONH_2$ | H | $C_2H_5$ | $C_2H_4CN$ | H | $CH_3COO^\ominus$ | Green. |
| 13 | $COCH_3$ | H | $C_2H_5$ | $C_2H_4CN$ | H | $CH_3COO^\ominus$ | Do. |
| 14 | H | $CONH_2$ | $C_2H_5$ | $C_2H_4CN$ | H | $HSO_4^\ominus$ | Blue-green. |
| 15 | $SO_2NH_2$ | H | $C_2H_5$ | $C_2H_4CN$ | $CH_3$ | $Cl^\ominus$ | Yellowish green. |
| 16 | $SO_2N(CH_3)_2$ | H | $C_2H_5$ | $C_2H_4CN$ | $OCH_3$ | $Cl^\ominus$ | Green. |
| 17 | CN | H | $C_2H_4OH$ | $C_2H_4OH$ | H | $CH_3COO^\ominus$ | Do. |
| 18 | $SO_2NH_2$ | H | $C_2H_4OH$ | $C_2H_4OH$ | H | $CH_3COO^\ominus$ | Do. |
| 19 | H | $SO_2NH_2$ | $C_2H_4OH$ | $C_2H_4OH$ | H | $CH_3COO^\ominus$ | Do. |
| 20 | H | CN | $CH_3$ | $C_2H_4CN$ | H | $CH_3COO^\ominus$ | Do. |
| 21 | H | $SO_2-N(CH_3)_2$ | $C_2H_5$ | $C_2H_4CN$ | H | $CH_3COO^\ominus$ | Do. |
| 22 | H | $SO_2CH_3$ | $C_2H_5$ | $C_2H_4CN$ | H | $CH_3COO^\ominus$ | Do. |
| 23 | H | $COCH_3$ | $C_2H_5$ | $C_2H_4CN$ | H | $CH_3COO^\ominus$ | Do. |
| 24 | $SO_2-NH_2$ | H | $C_2H_5$ | $C_2H_4CN$ | $CF_3$ | $CH_3COO^\ominus$ | Do. |
| 25 | $SO_2-NH_2$ | H | $C_2H_4CN$ | $C_2H_4CN$ | H | $HCOO^\ominus$ | Bluish green. |
| 26 | $SO_2-NH_2$ | H | $C_2H_4OH$ | $C_2H_4OH$ | $CH_3$ | $HCOO^\ominus$ | Green. |
| 27 | H | $SO_2NH_2$ | $C_2H_4CN$ | $C_2H_4CN$ | $C_2H_4CN$ | $CH_3COO^\ominus$ | Yellowish green. |
| 28 | H | $SO_2NH_2$ | $C_2H_4CN$ | $C_2H_4CN$ | H | $Cl^\ominus$ | Green. |
| 29 | H | $SO_2NH_2$ | $C_2H_4OH$ | $C_2H_4OH$ | H | $HSO_4^\ominus$ | Do. |
| 30 | H | $SO_2-N(CH_3)_2$ | $C_2H_4CN$ | $C_2H_4CN$ | $CH_3$ | $HCOO^\ominus$ | Do. |
| 31 | $SO_2-NH_2$ | H | $C_2H_4CN$ | $C_2H_4CN$ | $OCH_3$ | $CH_3COO^\ominus$ | Do. |
| 32 | $SO_2-NH-C_2H_5$ | H | $C_2H_4CN$ | $C_2H_4CN$ | $CH_3$ | $HCOO^\ominus$ | Do. |
| 33 | $SO_2-N(CH_3)_2$ | H | $C_2H_4CN$ | $C_2H_4CN$ | $CH_3$ | $HCOO^\ominus$ | Do. |
| 34 | $SO_2-N(CH_3)(C_6H_5)$ | H | $C_2H_4CN$ | $C_2H_4CN$ | $CH_3$ | $CH_3COO^\ominus$ | Do. |
| 35 | $SO_2-NH-C_6H_5$ | H | $C_2H_4CN$ | $C_2H_4CN$ | $CH_3$ | $CH_3COO^\ominus$ | Do. |
| 36 | H | $SO_2-N(CH_3)_2$ | $C_2H_4CN$ | $C_2H_4CN$ | H | $CH_3COO^\ominus$ | Bluish green. |
| 37 | H | $SO_2CH_3$ | $C_2H_4CN$ | $C_2H_4CN$ | H | $HCOO^\ominus$ | Green. |
| 38 | H | $SO_2-CH_3$ | $C_2H_4CN$ | $C_2H_4CN$ | $CH_3$ | $CH_3COO^\ominus$ | Do. |
| 39 | H | $CO-NH_2$ | $C_2H_4CN$ | $C_2H_4CN$ | $CH_3$ | $CH_3COO^\ominus$ | Do. |
| 40 | $COCH_3$ | H | $C_2H_4CN$ | $C_2H_4CN$ | $CH_3$ | $HCOO^\ominus$ | Do. |
| 41 | $SO_2-C_6H_4-CH_3$ | H | $C_2H_4CN$ | $C_2H_4CN$ | $CH_3$ | $CH_3COO^\ominus$ | Do. |
| 42 | $SO_2-N(C_2H_4OH)_2$ | H | $C_2H_4CN$ | $C_2H_4CN$ | $CH_3$ | $HCOO^\ominus$ | Do. |
| 43 | $SO_2-NH-C_2H_4OH$ | H | $C_2H_4CN$ | $C_2H_4CN$ | $CH_3$ | $CH_3COO^\ominus$ | Do. |
| 44 | $SO_2NH_2$ | H | $C_2H_4CN$ | $C_2H_4CN$ | $CF_3$ | $HCOO^\ominus$ | Do. |
| 45 | $SO_2N(CH_3)_2$ | H | $C_2H_4CN$ | $C_2H_4CN$ | $CF_3$ | $HCOO^\ominus$ | Do. |

EXAMPLE 46

A mixture of 42.6 parts of 1-N,N-di-(2'-cyanoethyl)-amino-3-methylbenzene, 10.6 parts of benzaldehyde, 100 parts of isopropyl alcohol, 20 parts of 37% sulphuric acid and 5 parts of urea is stirred for 3 hours at 70° under a jet of nitrogen. The reaction product settles out in crystalline form and on cooling it is filtered off; the leuco base thus obtained melts at 168°. Over 2 hours, 51.4 parts of this leuco base are entered with ice-cooling into a mixture of 160 parts of chlorosulphonic acid and 24 parts of thionyl chloride. The mixture is stirred for 4–5 hours at 0–5°, after which it is discharged into a mixture of 2200 parts of ice and 575 parts of concentrated ammonia, and the product filtered off, washed with water and dried. 59.2 parts of the leuco base thus obtained are dissolved in 400 parts of 37% sulphuric acid, and to this solution a solution of 10 parts of sodium bichromate in 30 parts of water is added at 10–15° with stirring. A dye is formed which has the formula

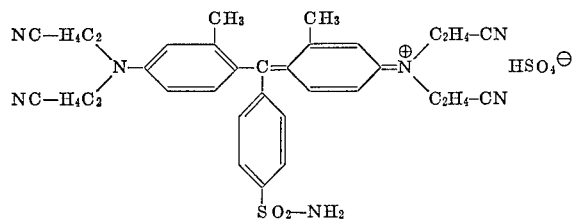

It dyes polyacrylonitrile fibres in brilliant green shades which have excellent ligh fastness and very good wet fastness properties.

EXAMPLE 47

A mixture of 42.6 parts of 1-N,N-di-(2'-cyanoethyl)-amino-3-methylbenzene, 20 parts of benzaldehyde-4-sulphonic acid amide, 100 parts of isopropyl alcohol, 20 parts of 37% sulphuric acid and 5 parts of urea is stirred for 3 hours at 70° under an injected nitrogen atmosphere. The reaction product crystallises out and, after cooling, it is filtered off. 51.4 parts of the resulting leuco base are dissolved in 400 parts of 37% sulphuric acid, to which is added dropwise at 10–15° a solution of 10 parts of sodium bichromate in 30 parts of water. The dye formed, which has the formula

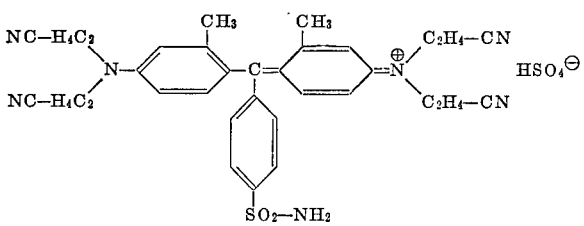

is filtered off, washed with water until free of acid, and dried with vacuum. It dyes polyacrylonitrile fibres in brilliant green shades having good fastness to light and wet treatments.

EXAMPLE 48

20 parts of the dye used in Example 1 and 80 parts of dextrin are intimately mixed in a ball mill for 48 hours. A printing paste is then prepared with the following additions:

75 parts of the ground dyeing preparation,
  10 parts of concentrated acetic acid,
  450 parts of sodium alginate thickening,
  25 parts of a cationic softener, e.g. the concentration product of equimolar amounts of stearic acid and triethanolamine,
  25 parts of Glauber's salt and
  415 parts of water
  ──────
  1000 parts A polyacrylonitrile fabric is printed with this paste by the conventional block printing process. The print is dried in the air and then fixed in a star steamer with saturated steam for 20 minutes, after which it is rinsed, soaped, rinsed again and dried. A level, brilliant green print with good fastness properties is obtained.

Formulae of representative dyes of the foregoing examples are as follows:

Example 1

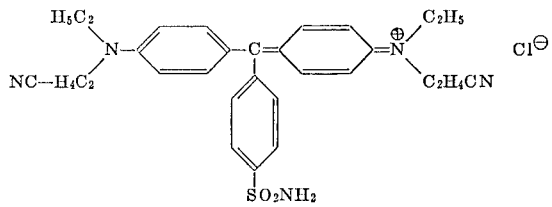

Example 7

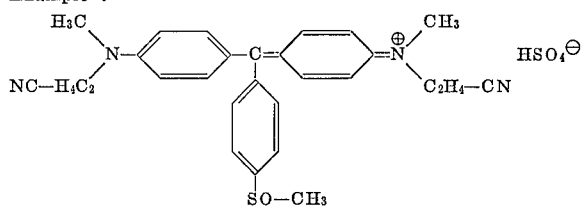

Example 15

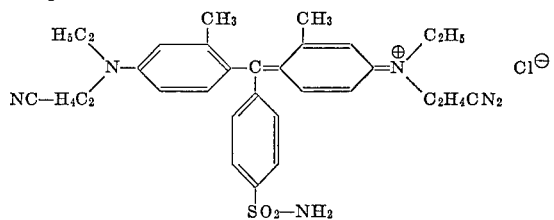

Example 40

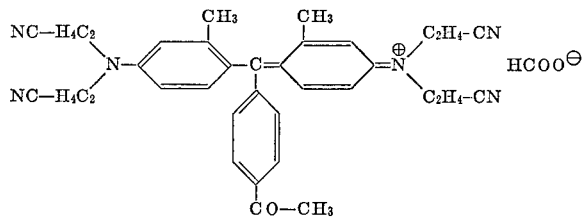

Example 46

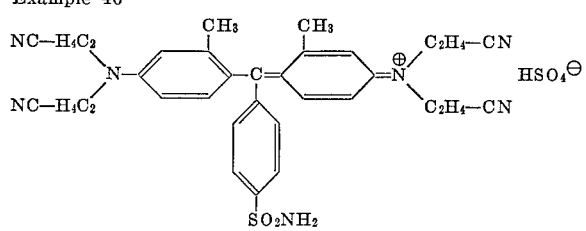

Having thus disclosed the invention what I claim is:
1. Basic dye of the diaminotriarylmethane series of the formula

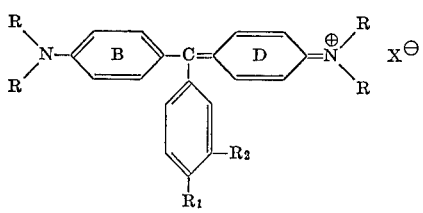

wherein
  one of $R_1$ and $R_2$ is hydrogen and the other is a member selected from the group consisting of cyano, alkylsulphonyl, arylsulphonyl, alkylcarbonyl, arylcarbonyl, sulphonic acid amide and carboxylic acid amide; each alkyl of alkylsulphonyl or alkylcarbonyl is alkyl having from 1 to 6 carbon atoms; each aryl of arylsulphonyl and arylcarbonyl is either phenyl or naphthyl;

sulphonic acid amide is a radical of the formula $$-SO_2-N(R_8)R_9$$

carboxylic acid amide is a radical of the formula $$-CO-N(R_8)R_9$$

each of $R_8$ and $R_9$ is, independently, a member selected from the group consisting of a hydrogen atom, alkyl and hydroxyalkyl having from 1 to 8 carbon atoms, phenyl, naphthyl and cyclohexyl;

at least two of the radicals R are cyanalkyl or hydroxyalkyl, the alkyl of which contains from 1 to 6 carbon atoms; any remaining radicals R are alkyl radicals, each containing from 1 to 8 carbon atoms;

$X^\ominus$ is an anion equivalent to the dye cation; and each of rings B and D is either further unsubstituted or further substituted, any substituent thereon being a member selected from the group consisting of halo, lower alkyl, lower alkoxy, cyano(lower)alkyl and fluoro(lower)alkyl.

2. Basic dye according to claim 1 wherein each of rings B and D is further substituted.

3. Basic dye according to claim 2 wherein each of rings B and D is substituted in a position ortho to the methane carbon.

4. Basic dye according to claim 1 of the formula

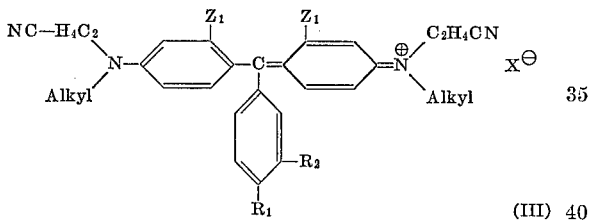

(III)

where each $Z_1$ represents an alkyl or alkoxy radical having 1 to 4 carbon atoms and "alkyl" a lower alkyl radical.

5. Basic dye according to claim 4 of the Formula III, in which each $Z_1$ stands for a methyl, ethyl, methoxy or ethoxy radical.

6. Basic dye according to claim 1 of the formula

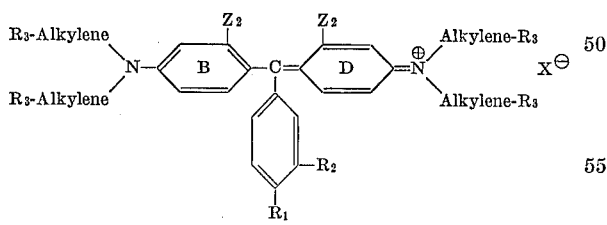

wherein
each $R_3$ is a member selected from the group consisting of hydroxy and cyano; and
each $Z_2$ is a member selected from the group consisting of hydrogen, halo, lower alkyl, lower alkoxy, cyano(lower)alkyl and fluoro(lower)alkyl.

7. The basic dye according to claim 1 of the formula

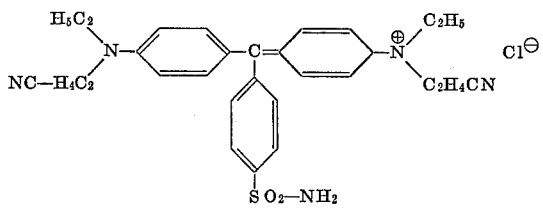

8. The basic dye according to claim 1 of the formula

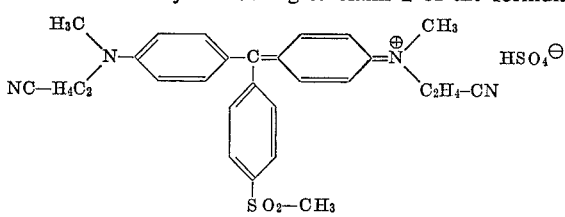

9. The basic dye according to claim 1 of the formula

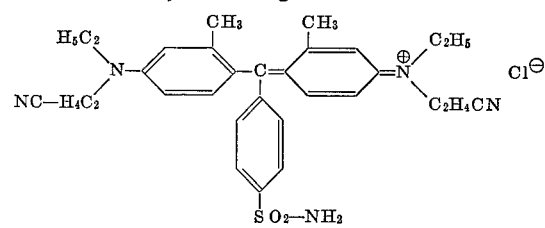

10. The basic dye according to claim 1 of the formula

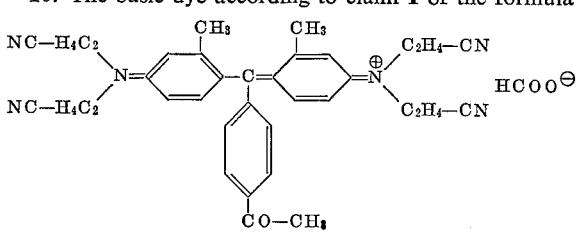

11. The basic dye according to claim 1 of the formula

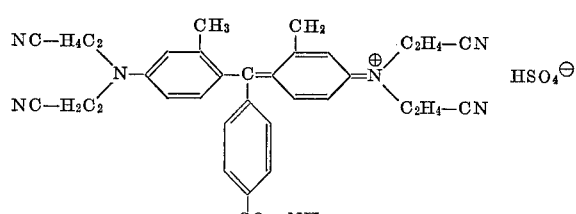

12. Basic dye according to claim 1 of the formula

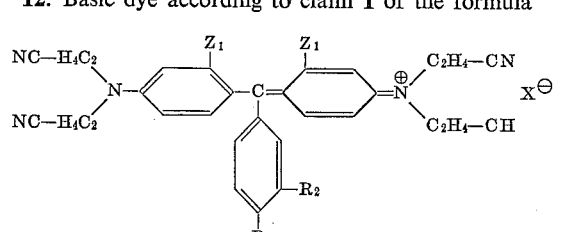

(V)

in which each $Z_1$ represents alkyl or alkoxy having 1 to 4 carbon atoms.

13. Basic dye according to claim 12 wherein each $Z_1$ is a member selected from the group consisting of methyl, ethyl, methoxy and ethoxy.

14. Basic dye according to claim 12 wherein each $Z_1$ is methyl and $R_1$ is a sulphonic acid amide.

15. Basic dye according to claim 1 wherein $R_1$ is a sulphonic acid amide.

16. Basic dye according to claim 1 of the formula

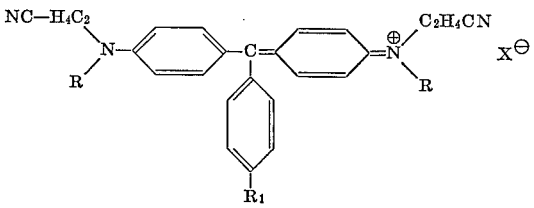

wherein
each R contains two carbon atoms and
$R_1$ is a sulphonic acid amide.

17. Basic dye of the diaminotriarylmethane series having the formula

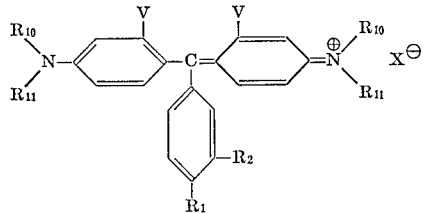

wherein one of $R_1$ and $R_2$ stands for hydrogen and the other for cyano, the sulphonic acid amide group, sulfonic acid mono(lower)alkylamide, sulfonic acid di(lower) alkylamide, sulfonic acid mono[hydroxy(lower)alkyl]amide, sulfonic acid di[hydroxy(lower) alkyl] amide, sulfonic acid monophenylamide, sulfonic acid N-(lower)alkyl-N-phenylamide, lower alkylsulfonyl, (lower)alkylphenylsulfonyl, or aminocarbonyl;

V stands for hydrogen, lower alkyl, lower alkoxy, trifluoromethyl or cyanethyl;

$R_{10}$ stands for lower alkyl, cyanethyl or hydroxyethyl;

$R_{11}$ stands for cyanethyl or hydroxyethyl; and $X^\ominus$ for an anion equivalent to the dye cation.

18. Basic dye according to claim 17 in which each V is lower alkyl or lower alkoxy.

19. Basic dye according to claim 17 of the formula

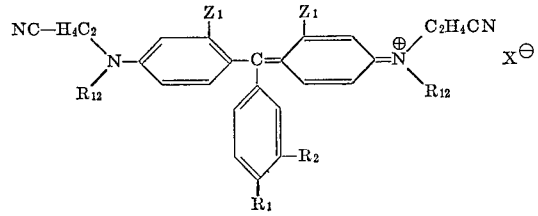

wherein each $Z_1$ is alkyl or alkoxy having 1 to 4 carbon atoms; and $R_{12}$ is lower alkyl.

20. Basic dye according to claim 17 of the formula

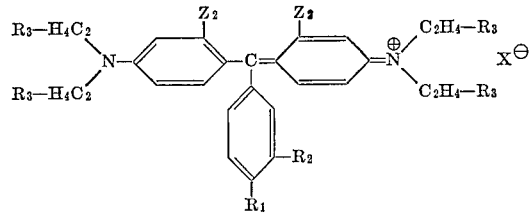

wherein each $R_3$ is hydroxy or cyano; and each $Z_2$ is a hydrogen atom, lower alkyl or lower alkoxy.

21. Basic dye according to claim 17 of the formula

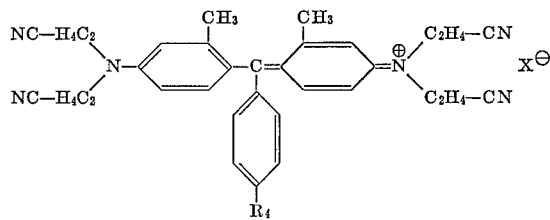

wherein $R_4$ is the sulfonic acid amide group, sulfonic acid mono-(lower) alkylamide, sulfonic acid di(lower alkyl)amide, sulfonic acid mono[hydroxy(lower)alkyl]amide, sulfonic acid di[hydroxy(lower)alkyl]amide, sulfonic acid monophenylamide or sulfonic acid N-(lower)alkyl-N-phenylamide.

22. Basic dye according to claim 17 of the formula

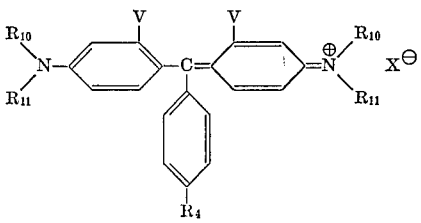

wherein $R_4$ is the sulfonic acid amide group, sulfonic acid mono-(lower) alkylamide, sulfonic acid di(lower alkyl)amide, sulfonic acid mono[hydroxy(lower)alkyl]amide, sulfonic acid di[hydroxy(lower)alkyl]amide, sulfonic acid monophenylamide or sulfonic acid N-(lower)alkyl-N-phenylamide.

23. Basic dye according to claim 17 of the formula

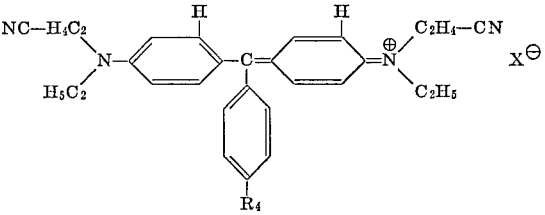

wherein $R_4$ is the sulfonic acid amide group, sulfonic acid mono-(lower)alkylamide, sulfonic acid di(lower alkyl)amide, sulfonic acid mono[hydroxy(lower)alkyl]amide, sulfonic acid di[hydroxy(lower)alkyl]amide, sulfonic acid monophenylamide, sulfonic acid N-(lower)alkyl-N-phenylamide.

References Cited

UNITED STATES PATENTS 2,085,736   7/1937   Calcott et al. _____ 260—394

LORRAINE A. WEINBERGER, Primary Examiner

L. A. THAXTON, Assistant Examiner

U.S. Cl. X.R.

8—55; 260—394

UNITED STATES PATENT OFFICE
CERTIFICATE OF CORRECTION

Patent No. 3,535,347        Dated October 20, 1970

Inventor(s) PETER BITTERLI

It is certified that error appears in the above-identified patent and that said Letters Patent are hereby corrected as shown below:

Column 1, line 38, "remainding" should read --remaining--; line 57, "optionaly" should read --optionally--. Column 3, line 65, "6" should read --6,--. Column 4, line 60, "preserve" should read --reserve--. Column 5, line 6, "60°" should read --60°,--. Columns 5 and 6, heading of sixth column of table, "Anion $X_1^{\ominus}$" should read --Anion $X^{\ominus}$--. Column 8, line 25, "SO-$CH_3$" should read --$SO_2$-$CH_3$--; line 32, "$C_2H_4CN_2$" should read --$C_2H_4CN$--. Column 9, line 6, "-$SO_2$-N($R_8$)$R_9$" should read -- -$SO_2$-N($R_8$)$R_9$;--; line 9, "-CO-N($R_8$)$R_9$" should read -- -CO-N($R_8$)$R_9$;--. Column 10, line 25, "N=" should read --N- --; line 34, "$CH_2$" should read --$CH_3$--; line 37 "NC-$H_2C_2$" should read --NC-$H_4C_2$--. Column 12, line 40,

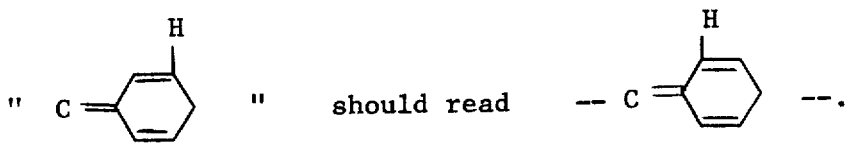

Signed and sealed this 27th day of June 1972.

(SEAL)
Attest:

EDWARD M. FLETCHER, JR.        ROBERT GOTTSCHALK
Attesting Officer              Commissioner of Patents